US012630299B2

(12) United States Patent　　　　　(10) Patent No.:　US 12,630,299 B2

Goldman　　　　　　　　　　　　　　　(45) Date of Patent:　　May 19, 2026

(54) SYSTEM AND METHOD FOR CONTROLLING ENGINES OF A MULTI-ENGINE AIRCRAFT ENGINE ASSEMBLY

(71) Applicant: Pratt & Whitney Canada Corp., Longueuil (CA)

(72) Inventor: Avrum Goldman, Ville St-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 324 days.

(21) Appl. No.: 18/211,033

(22) Filed: Jun. 16, 2023

(65) Prior Publication Data

US 2024/0417092 A1　　　Dec. 19, 2024

(51) Int. Cl.
B64D 31/00　　　　　(2024.01)

(52) U.S. Cl.
CPC .................................. B64D 31/00 (2013.01)

(58) Field of Classification Search
CPC ........ B64D 31/00; F05D 2270/13; F02C 9/42
See application file for complete search history.

(56) References Cited

U.S. PATENT DOCUMENTS

| | | | | |
|---|---|---|---|---|
| 6,823,675 B2 * | 11/2004 | Brunell | .............. | G05B 23/0291 |
| | | | | 60/773 |
| 7,725,293 B2 * | 5/2010 | Bonissone | ......... | G05B 23/0283 |
| | | | | 702/182 |
| 7,769,507 B2 * | 8/2010 | Volponi | ................... | F01D 17/02 |
| | | | | 706/2 |
| 9,536,358 B2 * | 1/2017 | Germanetti | ............ | B64D 43/00 |
| 10,048,168 B2 | 8/2018 | Armstrong | | |
| 11,070,064 B2 | 7/2021 | Batsch-Smith | | |
| 11,639,690 B1 * | 5/2023 | Kupratis | ................... | F02C 7/32 |
| | | | | 60/773 |
| 2002/0091480 A1 * | 7/2002 | Greene | ...................... | F02C 9/42 |
| | | | | 701/100 |
| 2003/0176954 A1 * | 9/2003 | Jaw | ....................... | G05D 1/0005 |
| | | | | 701/8 |
| 2006/0117756 A1 * | 6/2006 | Wakeman | ............. | F01D 25/162 |
| | | | | 60/791 |

(Continued)

OTHER PUBLICATIONS

EP Search Report for EP Patent Application No. 24181768.3 dated Feb. 12, 2025.

*Primary Examiner* — Mussa A Shaawat
(74) *Attorney, Agent, or Firm* — Getz Balich LLC

(57)　　　　　ABSTRACT

An engine assembly for a multi-engine aircraft includes a plurality of engines including at least a first engine and a second engine, an engine load configured to be powered by each of the first engine and the second engine, and at least one controller. The at least one controller includes a processor in communication with a non-transitory memory storing instructions, which instructions when executed by the processor, cause the processor to: identify one or more engine characteristics for each of the first engine and the second engine, identify a first operating rule for the first engine and a second operating rule for the second engine using the identified one or more engine characteristics for each of the first engine and the second engine, and control a first engine power of the first engine using the first operating rule and control a second engine power of the second engine using the second operating rule.

20 Claims, 5 Drawing Sheets

(56)  References Cited

U.S. PATENT DOCUMENTS

| | | | | |
|---|---|---|---|---|
| 2012/0060505 A1* | 3/2012 | Fuller | G05B 13/00 | |
| | | | 60/773 | |
| 2013/0006439 A1* | 1/2013 | Selvaraj | G06Q 50/06 | |
| | | | 700/297 | |
| 2013/0184901 A1 | 7/2013 | Wall | | |
| 2013/0332025 A1* | 12/2013 | Ziarno | G05B 23/0213 | |
| | | | 701/33.4 | |
| 2015/0176488 A1* | 6/2015 | Borchers | F02C 6/02 | |
| | | | 60/773 | |
| 2015/0295581 A1* | 10/2015 | Shi | H02J 3/40 | |
| | | | 700/287 | |
| 2016/0016670 A1* | 1/2016 | Sautreuil | B64D 35/02 | |
| | | | 903/904 | |
| 2016/0222816 A1* | 8/2016 | Chen | F02C 9/32 | |
| 2018/0230946 A1* | 8/2018 | Virtue, Jr. | F02C 7/26 | |
| 2018/0305033 A1* | 10/2018 | Joubert | G05D 1/0072 | |
| 2020/0056497 A1 | 2/2020 | Terwilliger | | |
| 2020/0247553 A1* | 8/2020 | Prater | B64D 35/04 | |
| 2020/0248760 A1* | 8/2020 | Olson | B64D 35/08 | |
| 2020/0398993 A1* | 12/2020 | Drolet | B64D 43/00 | |
| 2021/0061452 A1* | 3/2021 | Olson | B64D 35/08 | |
| 2021/0070430 A1* | 3/2021 | Goodwin | B64D 27/33 | |
| 2021/0108579 A1* | 4/2021 | Jarvo | F02C 7/232 | |
| 2022/0063824 A1 | 3/2022 | Hiett | | |
| 2023/0050741 A1* | 2/2023 | Xuening | F02C 7/232 | |
| 2023/0211876 A1* | 7/2023 | Parsons | B64C 27/06 | |
| | | | 244/76 R | |
| 2023/0322400 A1 | 10/2023 | Medici | | |
| 2024/0084742 A1* | 3/2024 | Emrich | F02C 9/32 | |

* cited by examiner

500

IDENTIFY ONE OR MORE ENGINE CHARACTERISTICS FOR EACH ENGINE OF A MULTI-ENGINE AIRCRAFT ENGINE ASSEMBLY
502

IDENTIFY AN OPERATING RULE FOR EACH ENGINE USING THE ONE OR MORE ENGINE CHARACTERISTICS
504

CONTROL EACH ENGINE IN ACCORDANCE WITH THE RESPECTIVE OPERATING RULE FOR EACH ENGINE
506

SYSTEM AND METHOD FOR CONTROLLING ENGINES OF A MULTI-ENGINE AIRCRAFT ENGINE ASSEMBLY

TECHNICAL FIELD

This disclosure relates generally to an aircraft engine assembly including multiple engines and, more particularly, to systems and methods for controlling the engines of a multi-engine aircraft engine assembly.

BACKGROUND OF THE ART

Aircraft may include multiple engines configured to power one or more shared loads (e.g., mechanical and/or electrical loads). Various systems and methods for controlling engines of a multi-engine aircraft engine assembly are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine assembly for a multi-engine aircraft includes a plurality of engines including at least a first engine and a second engine, an engine load configured to be powered by each of the first engine and the second engine, and at least one controller. The at least one controller includes a processor in communication with a non-transitory memory storing instructions, which instructions when executed by the processor, cause the processor to: identify one or more engine characteristics for each of the first engine and the second engine, identify a first operating rule for the first engine and a second operating rule for the second engine using the identified one or more engine characteristics for each of the first engine and the second engine, and control a first engine power of the first engine using the first operating rule and control a second engine power of the second engine using the second operating rule.

In any of the aspects or embodiments described above and herein, the first operating rule may include a first target rate of change of an engine power for the first engine, the second operating rule may include a second target rate of change of engine power for the second engine, and the first target rate of change of engine power may be different than the second target rate of change of engine power.

In any of the aspects or embodiments described above and herein, the first operating rule may include a first target engine power ratio, the second operating rule may include a second target engine power ratio, and the first target engine power ratio may be different than the second target engine power ratio.

In any of the aspects or embodiments described above and herein, the one or more engine characteristics may include a first quantity of engine loading cycles for the first engine and a second quantity of engine loading cycles for the second engine. The first quantity of engine loading cycles may be greater than the second quantity of engine loading cycles. The first target rate of change of engine power may be less than the second target rate of change of engine power.

In any of the aspects or embodiments described above and herein, the engine load may be a mechanical load.

In any of the aspects or embodiments described above and herein, the first engine may include a first generator, the second engine may include a second generator, and the engine load may be an electrical load electrically connected to the first generator and the second generator.

In any of the aspects or embodiments described above and herein, the first engine may have a first engine configuration, the second engine may have a second engine configuration, and the first engine configuration may be different than the second engine configuration.

In any of the aspects or embodiments described above and herein, the first engine may have a first power output capacity, the second engine may have a second power output capacity, and the first power output capacity may be different than the second power output capacity.

In any of the aspects or embodiments described above and herein, the engine assembly may further include an aircraft propulsion system. The aircraft propulsion system may include the first engine.

In any of the aspects or embodiments described above and herein, the engine assembly may further include an auxiliary power unit. The auxiliary power unit may include the first engine.

In any of the aspects or embodiments described above and herein, the at least one controller may include a first controller for the first engine and a second controller for the second engine. The first controller may be connected in signal communication with the second controller. For each of the first controller and the second controller, the instructions, when executed by the processor, may further cause the processor to identify the first operating rule and the second operating rule.

In any of the aspects or embodiments described above and herein, the instructions, when executed by the processor, may further cause the processor to receive an input from an operator and identify the first operating rule and the second operating rule using the input.

According to another aspect of the present disclosure, a method for controlling engines of a multi-engine aircraft engine assembly includes: identifying one or more engine characteristics for each of a first engine and a second engine of the multi-engine aircraft engine assembly and identifying a first operating rule for the first engine using the one or more engine characteristics for each of the first engine and the second engine. The first operating rule includes a first target rate of change of engine power for the first engine. The method further includes identifying a second operating rule for the second engine using the one or more engine characteristics for each of the first engine and the second engine. The second operating rule includes a second target rate of change of engine power for the second engine. The first target rate of change of engine power is different than the second target rate of change of engine power. The method further includes controlling a first engine power of the first engine using the first operating rule and controlling a second engine power of the second engine using the second operating rule to power an engine load with each of the first engine and the second engine.

In any of the aspects or embodiments described above and herein, the first engine may have a first quantity of accumulated engine loading cycles, the second engine may have a second quantity of accumulated engine loading cycles, and the second quantity may be greater than the first quantity.

In any of the aspects or embodiments described above and herein, the first target rate of change of engine power may be greater than the second target rate of change of engine power.

According to another aspect of the present disclosure, an engine assembly for a multi-engine aircraft includes a propulsor, a first engine coupled to the propulsor by a gear assembly, a second engine coupled to the propulsor by the gear assembly, and at least one controller. The at least one controller includes a processor in communication with a non-transitory memory storing instructions, which instructions when executed by the processor, cause the processor to: identify one or more engine characteristics for each of the first engine and the second engine. The one or more engine characteristics include a first responsiveness of the first engine and a second responsiveness of the second engine. The instructions, when executed by the processor, further cause the processor to: identify a first operating rule for the first engine and a second operating rule for the second engine using the one or more engine characteristics for each of the first engine and the second engine. The first operating rule includes a first target rate of change of a first engine power parameter. The second operating rule includes a second target rate of change of a second engine power parameter which is different than the first target rate of change of the first engine power parameter. The instructions, when executed by the processor, further cause the processor to: control the first engine power parameter of the first engine using the first operating rule and control the second engine power parameter of the second engine using the second operating rule.

In any of the aspects or embodiments described above and herein, the first target rate of change of engine power may be greater than the second target rate of change of engine power.

In any of the aspects or embodiments described above and herein, the first operating rule may include a first target engine power, the second operating rule may include a second target engine power, and the first target engine power may be different than the second target engine power.

In any of the aspects or embodiments described above and herein, the second target engine power may be greater than the first target engine power.

In any of the aspects or embodiments described above and herein, the first engine power parameter may be a first shaft torque of the first engine and the second engine power parameter may be a second shaft torque of the second engine.

The present disclosure, and all its aspects, embodiments and advantages associated therewith will become more readily apparent in view of the detailed description provided below, including the accompanying drawings.

DETAILED DESCRIPTION

Figure 1:
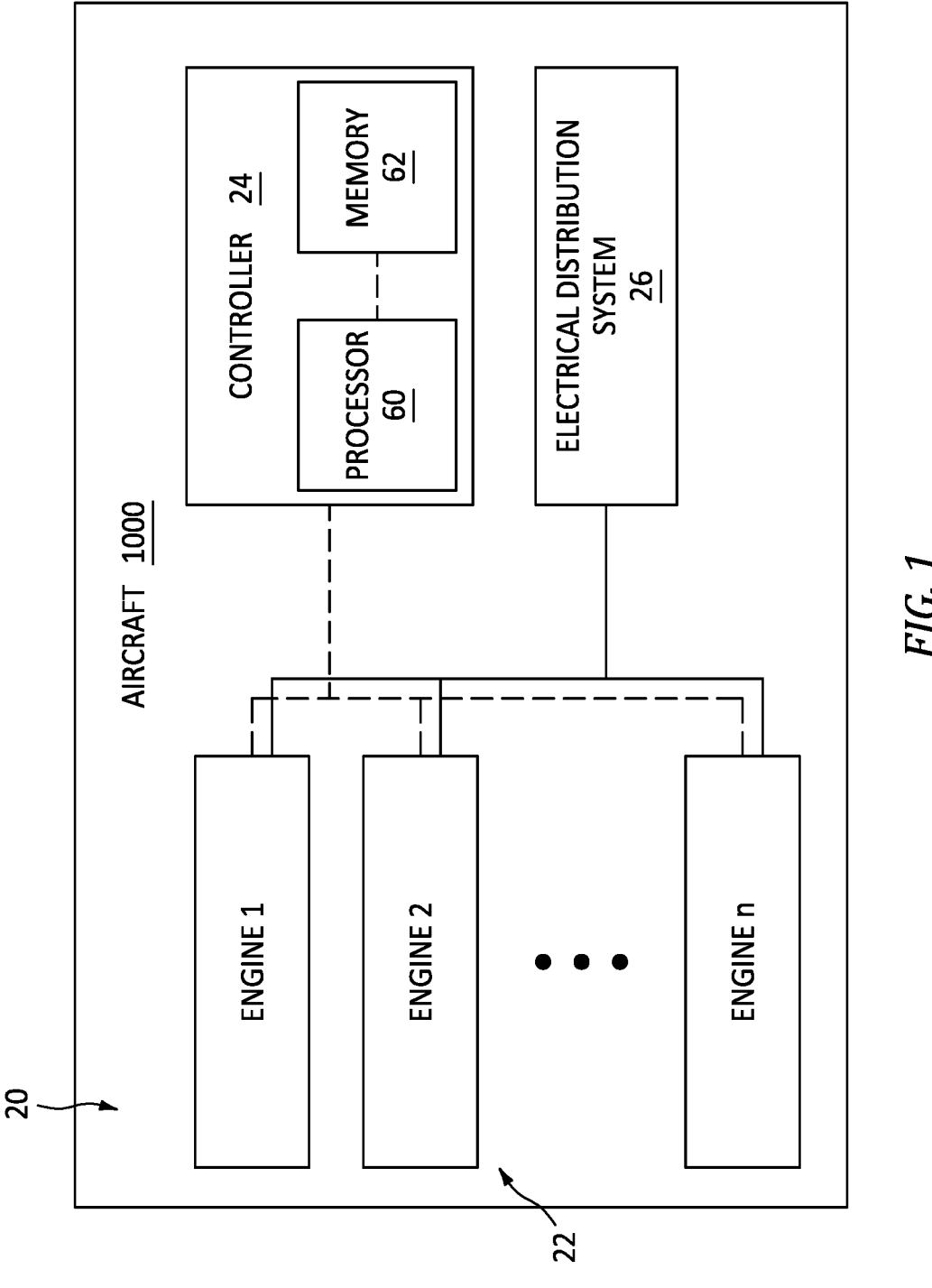
FIG. 1 diagrammatically illustrates an aircraft including an engine assembly, in accordance with one or more embodiments of the present disclosure.

FIG. 1 schematically illustrates an aircraft 1000. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft 1000 of FIG. 1 is configured as a multi-engine aircraft. As such, the aircraft 1000 of FIG. 1 includes an engine assembly 20 including a plurality of engines 22 (e.g., 2 engines, 3 engines, 4 engines, etc.). The engine assembly 20 further includes at least one controller 24. The aircraft 1000 and/or its engine assembly 20 may further include an electrical distribution system 26. For the exemplary engine assembly 20 configuration of FIG. 1, each of the engines 22 is electrically connected to or includes one or more components electrically connected to the electrical distribution system 26. The present disclosure, however, is not limited to this particular configuration of the engines 22 with the electrical distribution system 26.

The engines 22 configured to facilitate propulsion, electrical generation, and/or other support functions for the aircraft 1000. One or more of the engines 22 may form a portion of one or more propulsion systems for the aircraft 1000. For example, the one or more engines 22 may be configured to drive rotation of one or more propulsors (e.g., a propeller, a helicopter rotor, a fan, etc.) for the propulsion systems. One or more of the engines 22 may additionally or alternatively form an auxiliary power unit (APU) or other accessory engine for the aircraft 1000. Each of the engines 22 may have a same configuration (e.g., a same model, type, size, power output capacity, etc.) as one, more than one, or all of the other ones of the engines 22. Alternatively, at least one of the engines 22 may have a different configuration from at least another one of the engines 22. As will be discussed in further detail, each of the engines 22 may have a power output capacity, efficiency, responsiveness, wear, or other operational characteristic which is different from one or more of the other engines 22.

Figure 2:
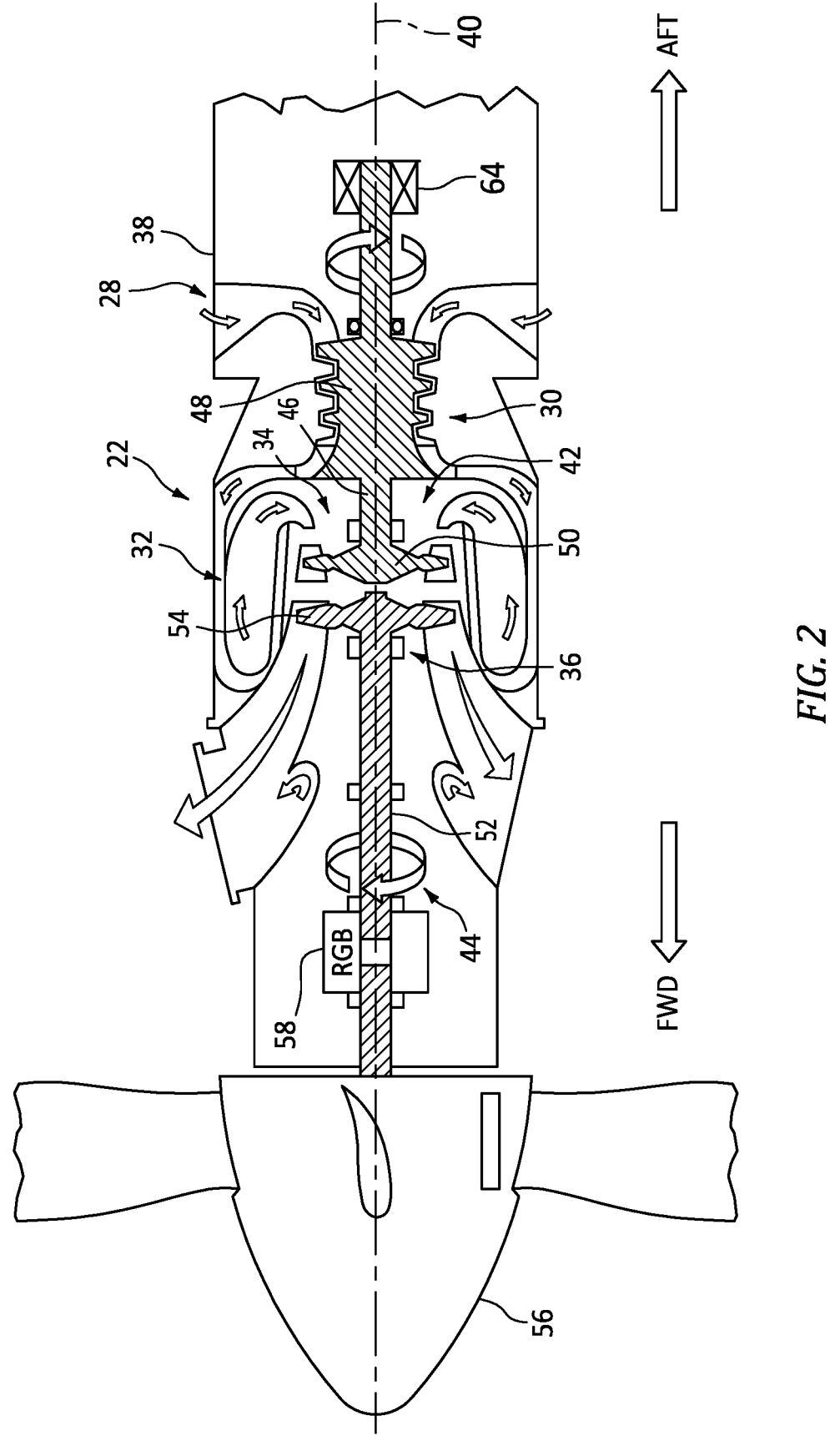
FIG. 2 schematically illustrates a cutaway, side view of an aircraft propulsion system including an engine, in accordance with one or more embodiments of the present disclosure.

FIG. 2 illustrates a side, cutaway view of an exemplary configuration for one of the engines 22. The engine 22 of FIG. 2 is configured as a turboprop gas turbine engine. However, the present disclosure is also applicable to other configurations of engines such as, but not limited to, a rotary engine (e.g., a Wankel engine), a piston engine, or the like. Moreover, the present disclosure is also applicable to other configurations of gas turbine engines such as, but not limited to, turboshaft gas turbine engines, turbofan gas turbine engines, turbojet gas turbine engines, propfan gas turbine engines, open rotor gas turbine engines, or the like.

The engine 22 of FIG. 2 includes an air inlet 28, a compressor 30, a combustor 32, a high-pressure turbine 34, a power turbine 36, and an engine static structure 38. The air inlet 28, the compressor 30, the combustor 32, the high-pressure turbine 34, and the power turbine 36 are arranged along an axial centerline 40 (e.g., a rotational axis) of the engine 22. The engine static structure 38 may include, for example, one or more engine cases for the engine 22. The engine static structure 38 may additionally include cowlings, bearing assemblies, and/or other structural components of the engine 22. The one or more engine cases form, house, and/or structurally support one or more of the air inlet 28, the compressor 30, the combustor 32, the high-pressure turbine 34, and the power turbine 36.

Components of the engine 22 of FIG. 2, such as components of the compressor 30, the high-pressure turbine 34, and the power turbine 36, are arranged as a first rotational assembly 42 (e.g., a high-pressure spool) and a second rotational assembly 44 (e.g., a power spool). The first rotational assembly 42 and the second rotational assembly 44 are mounted for rotation about the axial centerline 40 relative to the engine static structure 38.

The first rotational assembly 42 includes a first shaft 46, a bladed compressor rotor 48 for the compressor 30, and a bladed first turbine rotor 50 for the high-pressure turbine 34. The first shaft 46 interconnects the bladed compressor rotor 48 and the bladed first turbine rotor 50.

The second rotational assembly 44 includes a second shaft 52, a bladed second turbine rotor 54 for the power turbine 36, and a propulsor 56. The second shaft 52 is connected to the bladed second turbine rotor 54. The second shaft 52 may be directly or indirectly connected to the propulsor 56 (e.g., an input shaft of the propulsor 56). For example, the second shaft 52 may be configured to rotatably drive the propulsor 56 via a gearbox assembly 58. The second rotation assembly 44 may include additional components (e.g., a main rotor input shaft) for interconnecting the second shaft 52 with the bladed second turbine rotor 54 and the propulsor 56. The gearbox assembly 58 may be configured to drive the propulsor 56 at a different (e.g., a reduced) rotational speed relative to the second shaft 52. Alternatively, the second shaft 52 may directly interconnect the bladed second turbine rotor 54 and the propulsor 56. The propulsor 56 of FIG. 2 is a propeller configured for providing propulsion (e.g., thrust) for the aircraft 1000, however, the propulsor 56 of the present disclosure is not limited to propeller configurations and may alternatively be configured as other rotational loads for effecting aircraft propulsion (e.g., a helicopter rotor, an open rotor, a bladed fan, etc.).

During operation of the engine 22 of FIG. 2, ambient air enters the engine 22 through the air inlet 28 and is directed into the compressor 30. The ambient air is compressed by the bladed compressor rotor 48 and directed into a combustion chamber of the combustor 32. Fuel is injected into the combustion chamber and mixed with the compressed air to provide a fuel-air mixture. This fuel-air mixture is ignited, and combustion products thereof flow through and sequentially cause the bladed first turbine rotor 50 and the bladed second turbine rotor 54 to rotate. The rotation of the bladed first turbine rotor 50 and the bladed second turbine rotor 54 respectively drive rotation of the first rotational assembly 42 and the second rotational assembly 44. Rotation of the second rotational assembly 44 further drives rotation of the propulsor 56 to provide propulsion (e.g., thrust) for the aircraft 1000. Combustion exhaust gas flowing past the bladed second turbine rotor 54 along is directed out of the engine 22 (e.g., through an exhaust).

The controller 24 includes a processor 60 connected in signal communication with memory 62. The processor 60 may include any type of computing device, computational circuit, processor(s), CPU, computer, or the like capable of executing a series of instructions that are stored in the memory 62. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine assembly 22 to accomplish the same algorithmically and/or by coordination of components of the engine assembly 22. The memory 62 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 24. The controller 24 may include, or may be in communication with, an input device that enables a user to enter data and/or instructions, and may include, or be in communication with, an output device configured, for example to display information (e.g., a visual display or a printer), or to transfer data, etc. Communications between the controller 24 and other electrical and/or electronic components (e.g., controllers, sensors, etc.) may be via a hardwire connection or via a wireless connection. A person of skill in the art will recognize that portions of the controller 24 may assume various forms (e.g., digital signal processor, analog device, etc.) capable of performing the functions described herein. The controller 24 may be a single electronic control unit or, alternatively, may be formed by a plurality of discrete electronic control units (e.g., one for each engine 22), which discrete electronic control units may be connected in signal communication with one another.

The controller 24 may form or otherwise be part of an electronic engine controller (EEC) for one or more of the engines 22. The EEC may control operating parameters of one or more of the engines 22 including, but not limited to, fuel flow, stator vane position (e.g., variable compressor inlet guide vane (IGV) position), compressor air bleed valve position, shaft (e.g., first shaft 46 and/or second shaft 52) torque and/or rotation speed, etc. so as to control an engine power or performance of the one or more of the engines 22. The EEC may modulate fuel flow to the combustor 32 to obtain a desired output power of the engine 22. For example, the EEC may modulate the fuel flow using a closed-loop process in which an output power or other operating parameter of the one or more of the engines 22 is measured and fuel flow is increased or decreased as a function of the measured output power or operational parameter. The controller 24 may include or otherwise be connected in signal communication with one or more sensors to measure and/or determine the output power or operational parameters of one or more of the engines 22 such as, but not limited, shaft rotation speed sensors, shaft torque sensors, fuel flow rate sensors, pressure sensors, temperature sensors, and the like. In some embodiments, the EEC may be part of a full authority digital engine control (FADEC) system.

The electrical distribution system 26 of FIG. 2 is configured to supply electrical power for electrical loads of the engines 22 and/or the aircraft 1000 (see FIG. 1). Examples of electrical loads for the aircraft 1000 include, but are not limited to, electronic control systems, environmental control systems, electric motors, lighting systems, communication systems, and the like. The electrical distribution system 26 may include a generator 64 for generating and supplying electric power for the electrical distribution system 26. For example, the electrical distribution system 26 of FIG. 2 includes the generator 64 coupled to the first shaft 46. Rotation of the first shaft 46 drives the generator 64 (e.g., drives rotation of a rotor of the generator) to generate electrical power. While the generator 64 of FIG. 2 is coupled to the first shaft 46, the generator 64 may alternatively be connected to the second shaft 52.

Figures 3, 4:
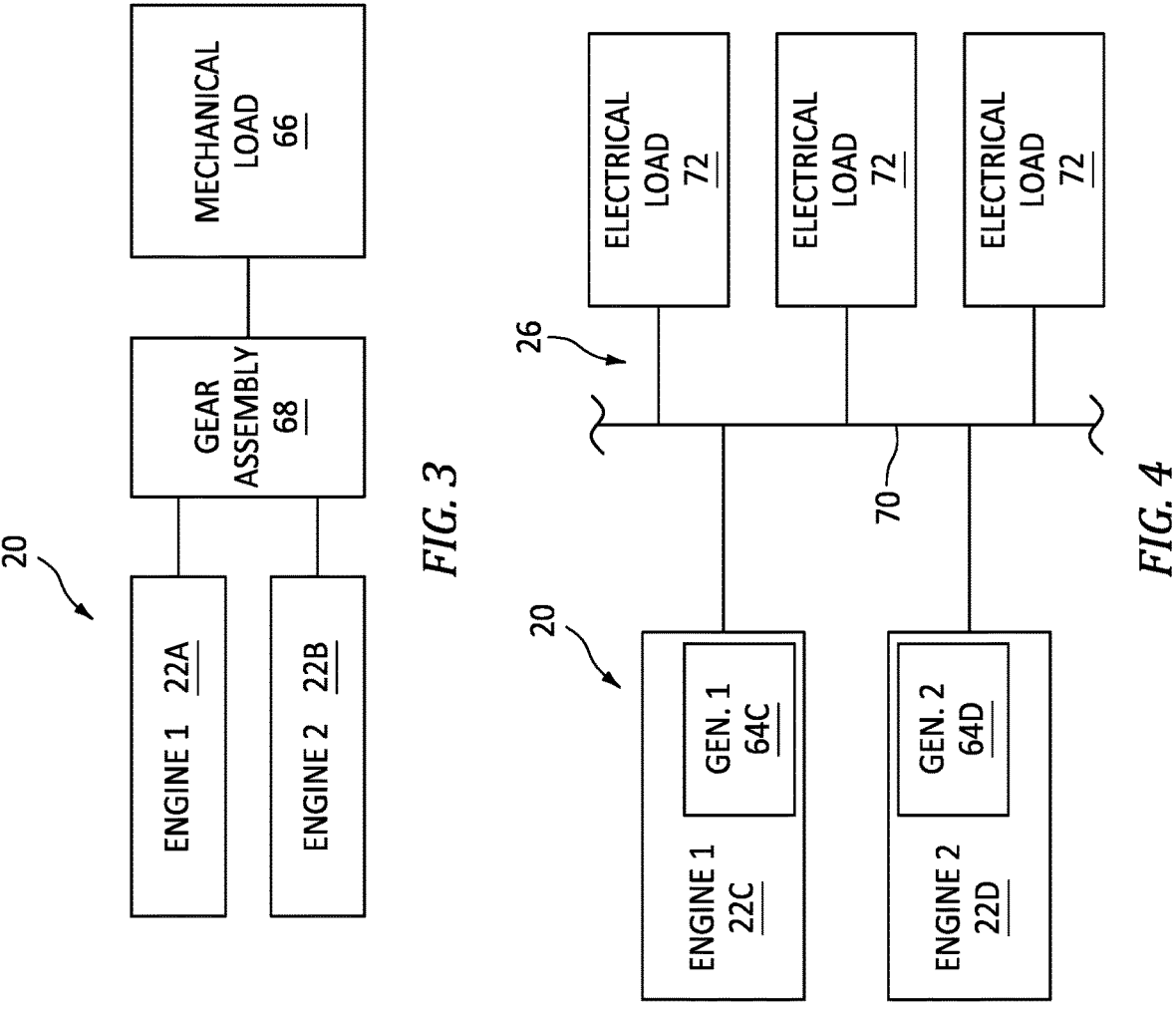
FIG. 3 diagrammatically illustrates an engine assembly configured for powering a mechanical load, in accordance with one or more embodiments of the present disclosure.
FIG. 4 diagrammatically illustrates an engine assembly configured for powering one or more electrical loads, in accordance with one or more embodiments of the present disclosure.

FIG. 3 illustrates a block diagram of an exemplary configuration of the engine assembly 20. The engine assembly 20 of FIG. 3 includes a first engine 22A and a second engine 22B. The first engine 22A and the second engine 22B (e.g., respective output shafts of the first engine 22A and the second engine 22B) are coupled to a mechanical load 66. The first engine 22A and the second engine 22B are configured to power (e.g., drive, rotate, etc.) the mechanical load 66. Examples of the mechanical load 66 include a helicopter rotor, a propeller, an electrical generator rotor, or the like. The first engine 22A and the second engine 22B of FIG. 3 are coupled to the mechanical load 66 by a gear assembly 68. The gear assembly 68 transmits the rotational output of the first engine 22A and the second engine 22B to the mechanical load 66 to effect rotation of the mechanical load 66.

FIG. 4 illustrates a block diagram of another exemplary configuration of the engine assembly 20. The engine assembly 20 of FIG. 4 includes a first engine 22C and a second engine 22D. The first engine 22C includes or is otherwise coupled (e.g., by an output shaft of the first engine 22C, a gear assembly, etc.) to a first generator 64C to drive the first generator 64C to generate electrical power. The second engine 22D includes or is otherwise coupled to (e.g., by an output shaft of the second engine 22D, a gear assembly, etc.) a second generator 64D to drive the second generator 64D to generate electrical power. The first generator 64C and the second generator 64D are electrically connected to an electrical distribution bus 70 of the electrical distribution system 26. One or more electrical loads 72 of the engines 22, 22C, 22D and/or the aircraft 1000 (see FIG. 1) are electrically connected to the electrical distribution bus 70 to receive electrical power from the electrical distribution bus 70, such that the first engine 22C and the second engine 22D are configured to power (e.g., facilitate generation of electrical power for) the electrical loads 72.

For at least some aircraft applications, a plurality of engines may be used to power one or more fluctuating mechanical and/or electrical loads, as previously discussed. For at least some conventional multi-engine aircraft engine assembly of which I am aware, identical operational control rules (e.g., implemented by an electronic control system) may be applied to each of the engines of the multi-engine aircraft engine assembly. However, fluctuating mechanical and/or electrical loads may contribute to high cyclic usage and wear of the engines due to frequent acceleration and deceleration cycles experienced by the engines when providing power for the fluctuating mechanical and/or electrical loads. This results in high engine operating costs as well as reduced reliability. Furthermore, with identical operational control rules for each engine, the engines may all respond to fluctuating mechanical and/or electrical loads at a same rate, thereby facilitating a slower response of engine power to mechanical and/or electrical load demand. Fluctuation mechanical and/or electrical loads may be exhibited, for example, by propulsion system acceleration and deceleration transients (e.g., an aircraft takeoff procedure), electric motor operation (e.g., an electric motor for a hybrid-electric propulsion system), or the like.

Figure 5:
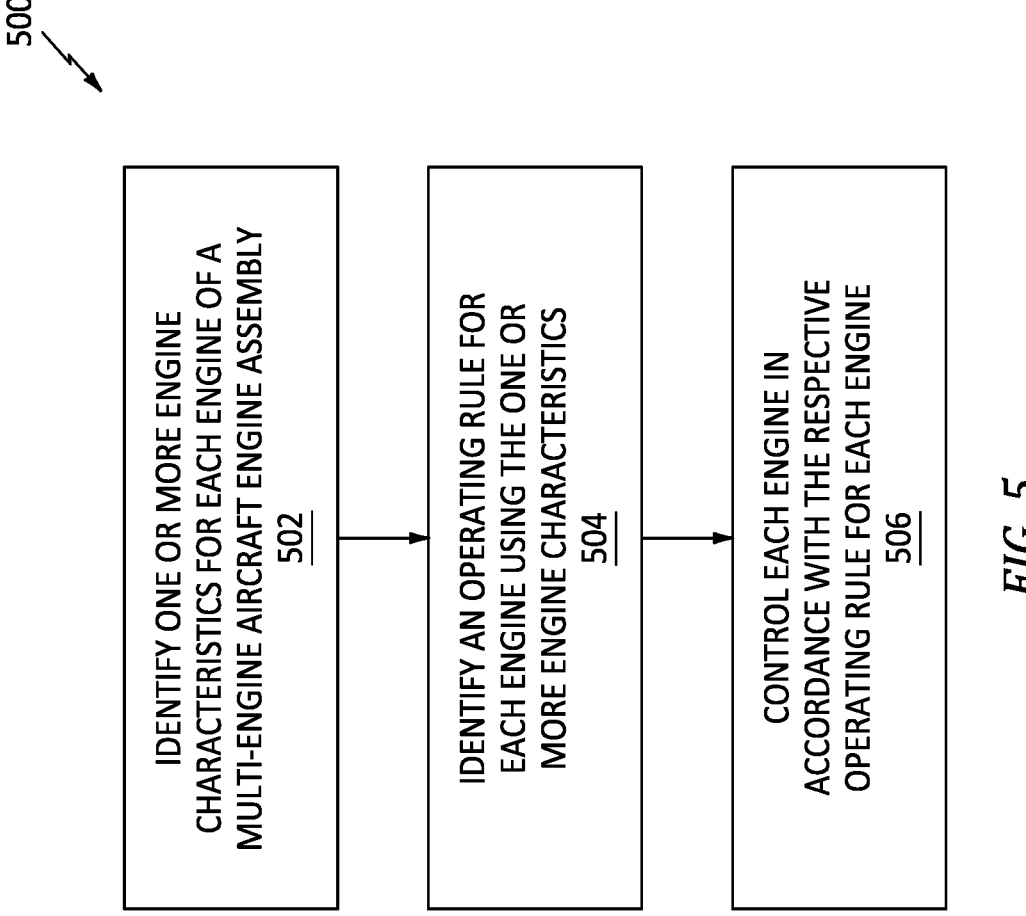
FIG. 5 illustrates a block diagram depicting a method for controlling engines of a multi-engine aircraft engine assembly, in accordance with one or more embodiments of the present disclosure.

Referring to FIGS. 1, 2, and 5, a Method 500 for controlling engines of a multi-engine aircraft engine assembly is provided. FIG. 5 illustrates a flowchart for the Method 500. The Method 500 may be performed for the engine assembly 20, as described herein. The controller 24 may be used to execute or control one or more steps of the Method 500 for the engine assembly 20. For example, the processor 60 may execute instructions stored in memory 62, thereby causing the controller 24 and/or its processor 60 to execute or otherwise control one or more steps of the Method 500. However, it should be understood that the Method 500 is not limited to use with the engine assembly 20, engines 22, and/or the controller 24. Unless otherwise noted herein, it should be understood that the steps of Method 500 are not required to be performed in the specific sequence in which they are discussed below and, in some embodiments, the steps of Method 500 may be performed separately or simultaneously.

Figure 6:
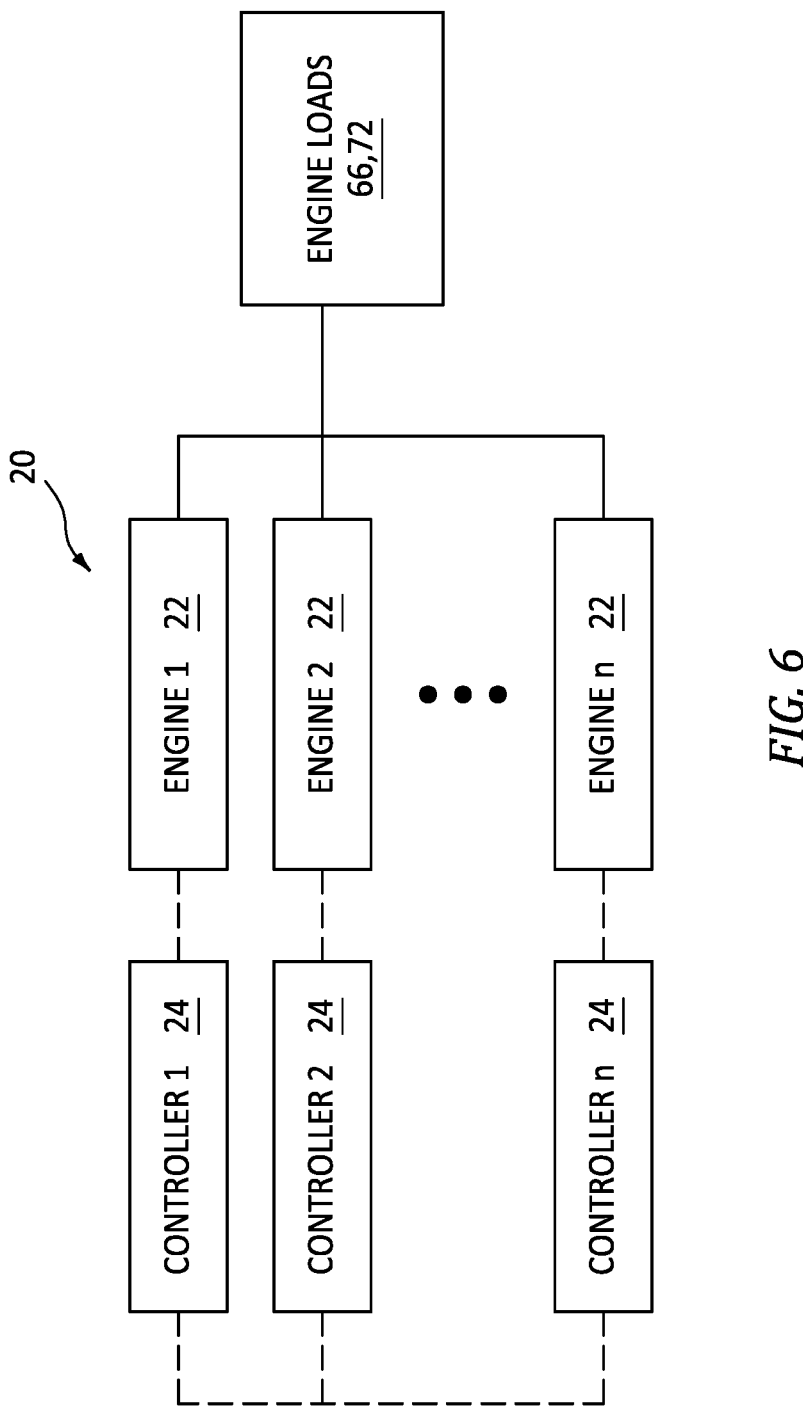
FIG. 6 diagrammatically illustrates another engine assembly for an aircraft, in accordance with one or more embodiments of the present disclosure.

Step 502 includes identifying one or more engine characteristics for each of the engines 22. The controller 24 may identify the one or more engine characteristics for each of the engines 22, for example, continuously during operation of the engines 22. Examples of engine characteristics include, but are not limited to, accumulated engine loading cycles or other parameters indicative of engine operation and wear, engine efficiency, engine power output capacity, and engine responsiveness. The engine characteristics may be predetermined values (e.g., stored in memory 62) and/or dynamically determined values. One or more engine characteristics may be measured (e.g., using one or more sensors of the engines 22), calculated, synthesized, and/or modeled by the controller 24, or otherwise determined by the controller 24. For example, the controller 24 may determine an engine efficiency of one or more of the engines 22 based on a comparison of combustor fuel flow to an engine output power or engine output torque of the respective engines 22. For further example, the controller 24 may determine an engine responsiveness of one or more of the engines 22 based on a comparison of a rate of change of engine output power and/or engine output torque to a change in target engine output power and/or target engine output torque. The engine characteristics for each of the engines 22 may be identified by a single controller 24 connected in signal communication with components (e.g., sensors) of each of the engines 22. Alternatively, and as shown in FIG. 6, each of the engines 22 may include or otherwise be controlled by a discrete controller 24 (e.g., a dedicated EEC or FADEC). Each of the controllers 24 may be connected in signal communication. Each of the controllers 24 may identify the engine characteristics for the respective one of the engines 22 and communicate the engine characteristics to the other controllers 24.

Step 504 includes identifying an operating rule for each of the engines 22 using the engine characteristics identified for each of the engines 22. The operating rule for each of the engines 22 includes instructions (e.g., instructions stored in memory 62) which, when executed by the controller(s) 24 and/or its processor 60, cause the controller(s) 24 and/or its processor to control a responsiveness of each of the respective engines 22 to load demand (e.g., load fluctuation) from one or more loads (e.g., the mechanical loads 66 and/or the electrical loads 72; see FIGS. 3 and 4) which are shared by the engines 22. As will be discussed in further detail, the engine responsiveness controlled by the controller(s) 24 using the operating rule may be characterized, in general, by a target rate of change of engine power in response to changing load demand. The operating rule for each of the engines 22 may include other instructions which, when executed by the controller(s) 24 and/or its processor 60, cause the controller(s) 24 and/or its processor to control other operating parameters of each of the respective engines 22 such as, but not limited to, a torque, an engine power (e.g., a shaft horsepower (SHP)), and/or an engine power ratio (e.g., a ratio of power output of each engine 22 relative to a total power output of the engines 22 of the engine assembly 20).

The identified operating rule for each of the engines 22 may be different than the identified operating rule for one or more of the other engines 22. Accordingly, the operating rule for each of the engines 22 may be used to designate one or more of the engines 22 (e.g., engines 22 having a relatively higher responsiveness) for responding to fluctuating load demand while another one or more of the engines 22 (e.g., engines 22 having a relatively lower responsiveness) may be designated, for example, to maintain a relatively constant power output. For example, an identified operating rule for a first of the engines 22 may include a first target rate of change of engine power and an identified operating rule for a second of the engines 22 may include a second target rate of change of engine power which is different than the first target rate of change of engine power. The second target rate of change of engine power may be less than that first target rate of change of engine power such that the second engine may be controlled to maintain a relatively constant power output while the first engine may be controlled to more rapidly change power in response to fluctuating loading demand. The identified operating rule for each of the first and the second of the engines 22 may additionally include a target engine power and/or a target engine power ratio. For example, the identified operating rule for the first of the engines 22 may include a first target engine power ratio and the identified operating rule for the second of the engines 22 may include a second target engine power ratio which is greater than the first engine power ratio. The second of the engines 22 may, therefore, facilitate a high steady-state power output (e.g., base load power output) and greater efficiency relative to the first of the engines 22 which may facilitate a more rapid response to fluctuating load demand from loads of the aircraft 1000 and/or the engine assembly 20. In this regard, the second of the engines 22 may experience fewer and/or less significant power output cycling and associated wear relative to the first of the engines 22.

The identified operating rule for each of the engines 22 may include predetermined instructions assigned to each of the engines 22 and stored in memory 62. For example, the identified operating rule for each of the engines 22 may be selected or otherwise determined by a pilot or other operator for the engine assembly 20 prior to operation of the engine assembly 20 (e.g., operation of the engine assembly 20 for a flight condition). Alternatively, the identified operating rule for each of the engines 22 may be dynamically determined (e.g., continuously measured or otherwise determined by the controller(s) 24), for example, based on the identified engine characteristics for each of the engines 22. For example, a first of the engines 22 may have a first power output capacity and the second of the engines 22 may have a second power output capacity which is greater than the first power output capacity. Additionally or alternatively, the first of the engines 22 may have a first responsiveness which is greater than a second responsiveness of the second of the engines 22. The identified operating rule for the first of the engines 22 may include a first target engine power ratio and the identified operating rule for the second of the engines 22 may include a second target engine power ratio which is greater than the first engine power ratio, such that the second of the engines 22 (e.g., having a greater power output capacity) may facilitate a high steady-state power output and the first of the engines 22 (e.g., having a lower power output capacity and/or a greater responsiveness) may facilitate more rapid response to fluctuating load demand from loads of the aircraft 1000 and/or the engine assembly 20. For further example, a first of the engines 22 may have a high accumulation of engine loading cycles such that the first of the engines 22 may be at or close to an engine loading cycle threshold in which a maintenance action may be performed for the first of the engines 22. In this case, the operating rule for the first of the engines 22 may cause the first of the engines 22 to be operated at a steady-state power output while the second of the engines 22 may facilitate more rapid response to fluctuating load demand from loads of the aircraft 1000 and/or the engine assembly 20. Accordingly, the controller(s) 24 may identify operating rules for each of the engines 22 such that the engines 22, as a plurality, facilitate improved steady-state power output, efficiency, responsiveness, operational life, and/or maintenance cost in powering their shared electrical and/or mechanical loads.

The controller(s) 24 may be configured to receive input from a pilot or other operator of the aircraft 1000 and/or its engines 22, which input may be used to further identify the operating rules for the engines 22. For example, the operator may select a relative weighting between steady-state performance, transient response performance (e.g., acceleration), and operating cost for the engines 22. The controller(s) 24 may identify the operating rules for the engines 22 using the identified engine characteristics for each of the engines 22 as well as the operator weighting input. For example, the operator may select transient response performance to be assigned the greatest weight by the controller(s) 24. As previously discussed, the controller(s) 24 may have determined an engine responsiveness and/or other performance characteristics of the engines 22 (see Step 502). The controller(s) 24 may then identify operating rules for the engines 22, which operating rules may cause the controller(s) 24 to operate each of the engines 22 at its maximum responsiveness (e.g., acceleration) capability to achieve the greatest responsiveness of the engines 22 to changes in total load demand (e.g., mechanical and electrical). Because performance of the engines 22 will vary over time and usage, the controller(s) 24 will monitor the one or more engine characteristics and modify (e.g., optimize) the operating rules as the one or more engine characteristics (e.g., responsiveness) change.

Step 506 includes operating the engines 22 in accordance with the identified operating rule for each of the engines 22. For example, the controller 24 may modulate fuel flow to a combustor (e.g., the combustor 32) or other combustion chamber of each of the engines 22 to obtain a desired engine power output of each of the engines 22. The controller 24 may modulate the fuel flow using a closed-loop process in which an engine power output or other operating parameter (e.g., torque, shaft horsepower (SHP), etc.) of the one or more of the engines 22 is measured and fuel flow is increased or decreased as a function of the measured engine power output or other operational parameter. The controller 24 may modulate the fuel flow in response to achieve the target rate of change of engine power, target engine power, target engine power ratio, and/or other instructions of the operating rule for each of the engines 22 (e.g., within a specified tolerance).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine assembly for a multi-engine aircraft, the engine assembly comprising:
   a plurality of engines including at least a first engine and a second engine;
   an engine load configured to be powered by each of the first engine and the second engine; and
   at least one controller including a processor in communication with a non-transitory memory storing instructions, which instructions when executed by the processor, cause the processor to:
   identify one or more engine characteristics for each of the first engine and the second engine, the one or more engine characteristics includes a first quantity of engine loading cycles for the first engine and a second quantity of engine loading cycles for the second engine;
   identify a first operating rule for the first engine and a second operating rule for the second engine using the identified one or more engine characteristics for each of the first engine and the second engine; and
   control a first engine power of the first engine using the first operating rule and control a second engine power of the second engine using the second operating rule.

2. The engine assembly of claim 1, wherein the first operating rule includes a first target rate of change of an engine power for the first engine, the second operating rule includes a second target rate of change of engine power for the second engine, and the first target rate of change of engine power is different than the second target rate of change of engine power.

3. The engine assembly of claim 2, wherein the first operating rule includes a first target engine power ratio, the second operating rule includes a second target engine power ratio, and the first target engine power ratio is different than the second target engine power ratio.

4. The engine assembly of claim 2, wherein the first quantity of engine loading cycles is greater than the second quantity of engine loading cycles, and the first target rate of change of engine power is less than the second target rate of change of engine power.

5. The engine assembly of claim 1, wherein the engine load is a mechanical load.

6. The engine assembly of claim 1, wherein the first engine includes a first generator, the second engine includes a second generator, and the engine load is an electrical load electrically connected to the first generator and the second generator.

7. The engine assembly of claim 1, wherein the first engine has a first engine configuration, the second engine has a second engine configuration, and the first engine configuration is different than the second engine configuration.

8. The engine assembly of claim 7, wherein the first engine has a first power output capacity, the second engine has a second power output capacity, and the first power output capacity is different than the second power output capacity.

9. The engine assembly of claim 1, further comprising an aircraft propulsion system, the aircraft propulsion system including the first engine.

10. The engine assembly of claim 1, further comprising an auxiliary power unit, the auxiliary power unit including the first engine.

11. The engine assembly of claim 1, wherein the at least one controller includes a first controller for the first engine and a second controller for the second engine, the first controller is connected in signal communication with the second controller, and for each of the first controller and the second controller, the instructions, when executed by the processor, further cause the processor to identify the first operating rule and the second operating rule.

12. The engine assembly of claim 1, wherein the instructions, when executed by the processor, further cause the processor to receive an input from an operator and identify the first operating rule and the second operating rule using the input.

13. A method for controlling engines of a multi-engine aircraft engine assembly, the method comprising:

identifying one or more engine characteristics for each of a first engine and a second engine of the multi-engine aircraft engine assembly, the one or more engine characteristics includes a first quantity of accumulated engine loading cycles for the first engine and a second quantity of accumulated engine loading cycles for the second engine;

identifying a first operating rule for the first engine using the one or more engine characteristics for each of the first engine and the second engine, and the first operating rule includes a first target rate of change of engine power for the first engine;

identifying a second operating rule for the second engine using the one or more engine characteristics for each of the first engine and the second engine, the second operating rule includes a second target rate of change of engine power for the second engine, and the first target rate of change of engine power is different than the second target rate of change of engine power; and controlling a first engine power of the first engine using the first operating rule and controlling a second engine power of the second engine using the second operating rule to power an engine load with each of the first engine and the second engine.

14. The method of claim 13, wherein the second quantity of accumulated engine loading cycles is greater than the first quantity of accumulated engine loading cycles.

15. The method of claim 14, wherein the first target rate of change of engine power is greater than the second target rate of change of engine power.

16. An engine assembly for a multi-engine aircraft, the engine assembly comprising:

a propulsor;

a first engine coupled to the propulsor by a gear assembly;

a second engine coupled to the propulsor by the gear assembly; and at least one controller including a processor in communication with a non-transitory memory storing instructions, which instructions when executed by the processor, cause the processor to:

identify one or more engine characteristics for each of the first engine and the second engine, and the one or more engine characteristics include a first responsiveness of the first engine and a second responsiveness of the second engine;

identify a first operating rule for the first engine and a second operating rule for the second engine using the one or more engine characteristics for each of the first engine and the second engine, the first operating rule including a first target rate of change of a first engine power parameter, and the second operating rule including a second target rate of change of a second engine power parameter which is different than the first target rate of change of the first engine power parameter; and control the first engine power parameter of the first engine using the first operating rule and control the second engine power parameter of the second engine using the second operating rule.

17. The engine assembly of claim 16, wherein the first target rate of change of engine power is greater than the second target rate of change of engine power.

18. The engine assembly of claim 17, wherein the first operating rule includes a first target engine power, the second operating rule includes a second target engine power, and the first target engine power is different than the second target engine power.

19. The engine assembly of claim 18, wherein the second target engine power is greater than the first target engine power.

20. The engine assembly of claim 16, wherein the first engine power parameter is a first shaft torque of the first engine and the second engine power parameter is a second shaft torque of the second engine.

* * * * *